United States Patent [19]
Silverbrook

[11] Patent Number: 6,134,021
[45] Date of Patent: *Oct. 17, 2000

[54] PRESENTATION GRAPHICS SYSTEM FOR A COLOR LASER COPIER

[75] Inventor: Kia Silverbrook, Woollahra, Australia

[73] Assignees: Canon Kabushiki Kaisha, Tokyo, Japan; Canon Information Systems Research Australia Pty Limited, New South Wales, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/053,364

[22] Filed: Apr. 28, 1993

[30] Foreign Application Priority Data

Apr. 29, 1992 [AU] Australia ................... PL2143

[51] Int. Cl.⁷ ........................................ G06F 15/00

[52] U.S. Cl. .................. 358/1.18; 358/1.16; 358/1.15

[58] Field of Search .................... 395/117, 135, 395/140, 141, 131, 146, 147, 109, 116, 115; 358/444, 448, 452, 462, 537, 404, 468, 470, 1.18, 1.9, 1.17, 1.16; 345/435, 440, 441, 431, 507, 433, 442, 443, 133, 135, 136; 707/502, 530, 792, 763; 382/305, 199

[56] References Cited

U.S. PATENT DOCUMENTS

| | | | |
|---|---|---|---|
| 4,752,894 | 6/1988 | Deering et al. | 395/109 |
| 4,870,397 | 9/1989 | Soto et al. | 340/747 |
| 5,028,991 | 7/1991 | Sekizawa et al. | 358/537 |
| 5,048,105 | 9/1991 | Adachi | 382/47 |
| 5,079,624 | 1/1992 | Sasuga et al. | 358/530 |
| 5,150,458 | 9/1992 | Masuzaki et al. | 395/135 |
| 5,185,662 | 2/1993 | Liston | 358/471 |
| 5,216,754 | 6/1993 | Sathi et al. | 395/115 |
| 5,262,760 | 11/1993 | Iwamura et al. | 345/145 |
| 5,287,489 | 2/1994 | Nimmo et al. | 395/500 |
| 5,337,258 | 8/1994 | Dennis | 364/551.01 |
| 5,502,804 | 3/1996 | Butterfield et al. | 395/116 |

FOREIGN PATENT DOCUMENTS

| | | |
|---|---|---|
| 2215554 | 9/1989 | United Kingdom . |
| 2246929 | 2/1992 | United Kingdom . |
| 2260057 | 3/1993 | United Kingdom . |

*Primary Examiner*—Dov Popovici
*Attorney, Agent, or Firm*—Fitzpatrick, Cella, Harper & Scinto

[57] ABSTRACT

A graphic system for a color copier includes a memory card for storing input object image data, a host processor connected to a user controllable keyboard for selecting and editing the object image data to create edited image data, a real-time processor for rendering the edited image data to output an image signal, and a communicator for communicating with the copier.

31 Claims, 3 Drawing Sheets

PRESENTATION GRAPHICS SYSTEM FOR A COLOR LASER COPIER

BACKGROUND

1. Field of the Invention

The present invention relates to colour laser copying, and in particular, discloses a presentation graphics system which can be connected to an existing colour laser copier that is provided with a video interface.

2. Description of the Related Art

Colour composition systems for creating full colour desk top publishing capable of creating and printing A3 size full colour images at 400 dots per inch (dpi) traditionally use a personal computer system with the aid of various input devices such as a mouse and a keyboard. The image is normally composed and stored in a frame buffer memory device on a pixel by pixel basis before the image is written out to the relevant display device, such as a colour printer on a line by line basis.

For an image the size of an A3 page, at 400 dpi, 4,632× 6,480 pixels must be stored. If 24-bits of colour are stored per pixel, this gives a total storage requirement of over 90-Mbytes. Such a storage size requirement is often a significant expense in the design of a full colour composition system in addition to a resulting increase in the size of any system incorporating the composition system, thereby hindering the acceptance of full colour systems in normal consumer markets.

SUMMARY OF THE INVENTION

It is an object of the present invention to provide a simplified image composition system for use with a printing device that substantially eliminates the need for storage of an image on a pixel by pixel basis.

In accordance with one aspect of the present invention there is disclosed a graphics system for a colour copier, the system comprises an input object image data, host processor means connected to a user controllable input means for selecting and editing the object image data to create edited image data, real-time processor means for rendering the edited image data to output an image signal and communication means for interconnecting the system with the copier for printing an image represented by said image signal.

BRIEF DESCRIPTION OF THE DRAWINGS

A number of embodiments of the present invention will now be described with reference to the accompanying drawings in which.

DETAILED DESCRIPTION OF THE PREFERRED EMBODIMENT

The present invention is specific application of technology disclosed in: U.S. patent application Ser. No. 08/053,373, filed Apr. 28, 1993, claiming priority from Australian Patent Application No. PL2147, filed Apr. 29, 1992, entitled "A Real-Time Object Based Graphics System"; U.S. patent application Ser. No. 08/053,212, filed Apr. 28, 1993, claiming priority from Australian Patent Application No. PL2148, filed Apr. 29, 1992, entitled "Method and Apparatus for Filing an Object Based Rasterised Image"; U.S. patent application Ser. No. 08/053,214, filed Apr. 28, 1993, claiming priority from Australian Patent Application No. PL2153, filed Apr. 29, 1992, entitled "Method and Apparatus for Providing Transparency in an Object Based Rasterised Image"; U.S. patent application Ser. No. 08/053,365, filed Apr. 28, 1993, claiming priority from Australian Patent Application No. PL2156, filed Apr. 29, 1992, entitled "Edge Calculation for Graphics Systems" and Australian Patent Application No. PL2145, filed Apr. 29, 1992, entitled "Object Sorting for Graphics Systems"; U.S. patent application Ser. No. 08/053,378, filed Apr. 28, 1993, claiming priority from Australian Patent Application No. PL2142, filed Apr. 29, 1992, entitled "A Preprocessing Pipeline for RTO Graphics System"; U.S. patent application Ser. No. 08/053,219, filed Apr. 28, 1993, claiming priority from Australian Patent Application No. PL2150, filed Apr. 29, 1992, entitled "Object Based Graphics Using Quadratic Polynomial Fragments"; and U.S. patent application Ser. No. 08/053,213, filed Apr. 28, 1993, claiming priority from Australian Patent Application No. PL2149, filed Apr. 29, 1992, entitled "Bezier Spline to Quadratic Polynomial Fragment Conversion".

all lodged herewith by the present applicant, the disclosure of each of which is hereby incorporated by cross-reference. Those specifications disclose arrangements by which real-time object based images can be created, generally using quadratic polynomial fragment (QPF) representations of objects.

Figure 1:
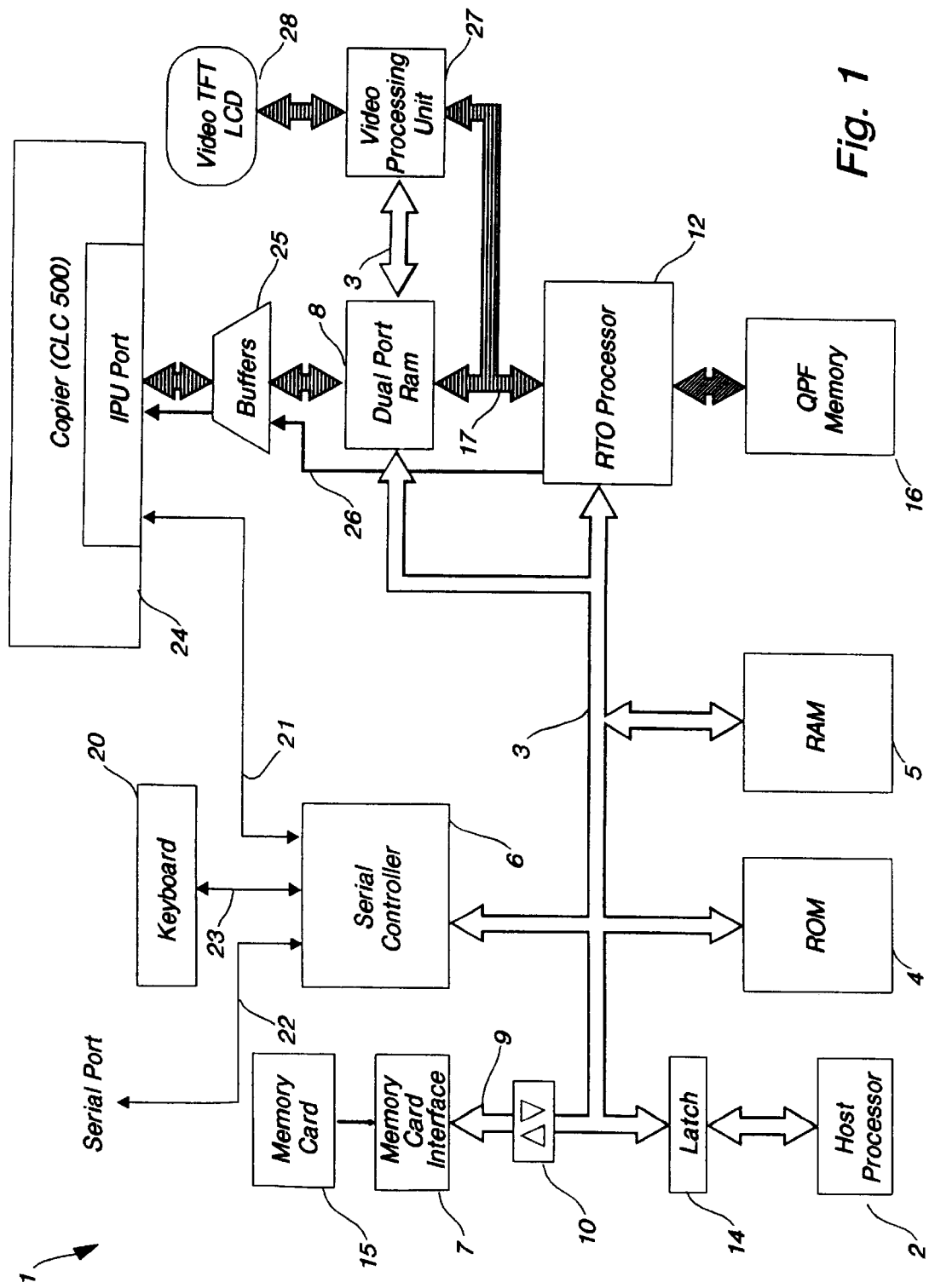
FIG. 1 is a schematic block diagram of a first embodiment.

Referring now to FIG. 1, there is shown a first embodiment of the present invention in the form of a presentation system 1 which includes a host processor 2 connected to a processor bus 3 via an address latch 14. Also connected to the processor bus 3 are a system ROM 4, a system RAM 5, a serial controller 6, a memory card interface socket 7, an RTO processor 12, and a dual port RAM 8.

The host processor 2 is a general purpose microprocessor which is arranged to control the generation of object based images. In the preferred embodiment, the host processor 2 is a 32 bit microprocessor such as the INTEL i960SA, which permits high speed operation at low cost and has a wide addressing range. The host processor 2 operates to create and maintain multiple object lists which are stored in the system RAM 5 and which include multiple objects which are ultimately processed the RTO processor 12 to form an image. The calculations for image generation are generally only performed at the graphic object level. For each image that is to be created, the host processor 2 specifies the position, size, and colour of each object that is to appear in the final image. The host processor 2 also interacts with the serial controller 6 to a keyboard 20 which allows the user to interface with the presentation system 1 for command and control, including the selection of graphic objects to form an image for printing. The serial controller 6 interprets keyboard commands from the keyboard 20 and forwards the keyboard commands to the host processor 2 via the processor bus 3.

The host processor 2 has a 16-bit external data bus which is multiplexed with a 32 bit address bus, in addition there are 16 control signals provided by the host processor 2. The most significant 16 address bits (bits 31-16) are not multiplexed, However address bits 15-4 are demultiplexed by the address latch 14. The host processor 2 has secondary control of the processor bus 3 whilst the RTO processor 12 can obtain access to the bus via DMA whenever it requires such access, except whenever specifically locked out via software controlling the host processor 2. The address latch 14 are of a tri-stated nature and are only used when the host processor 2 has control of the bus. The address bits 3,2,1 are demultiplexed directly by the host processor 2 to avoid any latch delays during burst accesses. During bursts, the upper address bits and the latched address bits remain static while address bits 3-1 count up. Thus host processor bursts are limited to 16 bytes. These bursts can occur in several combinations of byte and half-word accesses. All address decoding is based on the upper 4 address lines (aligned to 256 Mbyte boundaries), so one host processor burst cannot span multiple devices.

The multiplexed data bus of the host processor 2 is used to directly control the RTO processor 12, system RAM 5, system ROM 4, serial controller 6 and the memory card interface socket 7.

Arbitration of the processor bus 3 takes place between the host processor 2 and RTO processor 12. The host processor 2 masters the bus until the RTO processor 12 is commanded (by the host processor 2) to begin operation. The RTO processor 12 then takes control of the processor bus 3 and will notify the host processor 2 when it is finished. The host processor 2 has no mechanism to stop RTO processor 12 from obtaining the processor bus 3 except by halting the RTO processor 12 from operation. The RTO processor 12 will attempt to completely prepare an object list for printing or display once started and may use the processor bus 3 continuously once it gets it (if the RTO processor 12 is rendering at the same time it may bottleneck internally and release the processor bus 3 until it is able use it again). Multiple object lists can be used to make up an image, and hence the system software could use this approach to prevent the RTO processor 12 from holding too long a mastership of the processor bus 3.

The host processor 2 communicates with the various other devices of the presentation system 1 by means of memory mapped I/O. The upper 4-bits of the processor bus 3 are decoded by programmable array logfic units (PALs) (not shown) to provide all necessary enable and select signals, read and write strobes, buffer controls and the ready signal for the host processor 2. These logic units are active when the host processor 2 masters the bus and when RTO processor 12 masters the bus.

The system ROM 4 preferably contains 512 kilobytes of ROM which is generally provided by a single 256K×16 device. The system ROM 4 contains the controlling program for the presentation system 1 as well as various examples of images, fonts, clip titles, and other data used in the presentation system 1. Both the host processor 2 and RTO processor 12 can access the memory in the system ROM 4 and single and burst accesses are supported. Preferably, the system ROM 4 is wired so that larger ROMs can be used when they become readily available.

The system RAM 5 preferably contains 256K bytes of RAM which consists of two 128K×8 devices. The system RAM 5 is used by the host processor 2 for the caching of graphics objects including QPF lists, the caching of performance critical code, and as a variable storage. Single and burst accesses are supported, as are byte writes. Preferably, the system RAM 5 is also wired so that larger RAMs can be used when they become readily available.

The memory card interface socket 7 provided for the insertion of standardized memory cards. Typically, these sockets are adapted to take cards conforming to both the JEIDA and PCMIA standards. JEIDA (Japanese Electronics Industry Development Association) and PCMCIA (PC Memory Card International Organization) have released substantially identical standards for the use of 68 pin interchangeable memory cards. Each memory card 15 may be typically be used as ROM devices incorporating object graphic data, but can also be either flash EPROM or static Ram with battery backup. Each memory card 15 is used to store libraries of graphics objects, object edit lists, clip titles, fonts, characters, animation sequences and/or special programs which can be used to replace or supplement all or part of the programs within system ROM 4. Where static RAM cards are used, then these can also be used for storage of a user's images for later use. Preferably the memory card interface socket 7 is capable of accommodating cards with increased storage capabilities as they become available.

The memory card bus 9 to the memory cards is preferably buffered by a bidirectional buffer 10 from all other devices accessing the processor bus 3. This is to ensure that the memory cards 15 do not interfere with the logic levels of the processor bus 3 at any stage. Since a memory card 15 can be inserted or removed by the user at any time, some bus problems may be unavoidable. Short pins in the memory card interface socket 7 can be used to provide interrupts a short time before the card is removed. If the RTO processor 12 is mastering the processor bus 3 when a card is removed, the recovery time for the host processor 2 software will be reduced by the maximum bus tenure of the RTO processor 12. The memory card interface socket 7 is provided with short card detect pins which generate insertion and removal interrupts for the indication of the presence or otherwise of a memory card 15. The signals are sent to the serial controller 6 where they can be used for detection of removal, insertion of crooked memory cards. Detected memory card signal can then be relayed to the host processor 2 through a general interrupt. This allows notification of a software event to update the current state of the host processor 2 to take account of the removal.

In order to determine the nature of the memory card 15 inserted, an optional attribute memory may be read from the memory card 15. This attribute memory is only 8 bits wide and is read on the low data bus and is accessed at the predetermined memory address of the memory card. This allows the presentation system 1 to be used in conjunction with memory cards of different attributes and speeds. Preferably system software is provided to interrogate the memory cards and decide based on their speed and optional attribute memory, how the RTO processor 12 and the host processor 2 will best be able to safely access the memory cards.

Where SRAM type memory card devices with battery backups are supported, the memory card sockets 7 is provided with battery condition signals that are connect to the serial controller 6 and indicate whether the battery is good or bad.

The serial controller 6 is preferably implemented by a Exar 82C684 Quart device which includes four, full duplex, asynchronous serial channels, two timers and sixteen general purpose input and output ports. The connection of the serial controller 6 to processor bus 3 is only 8 bits wide so all accesses only exist on the lower (even) byte of the processor bus 3. A first serial communications link 21 of the serial controller 6 is used to communicate with an output device such as a Canon CLC 500 colour laser copier 24 to control the copying device and receive status information. A second serial communications link 22 is used as an RS232 interface which provides a means to interrogate and control the host processor 2 when performing servicing or updating system control software. A third serial communications link 23 is used to communicate with a keyboard 20 for the interactive entry of user requests, commands, selections and information. Additionally the serial controller 6 is also used for timer events, serial communication, special keyboard keys, and memory card insertion and removals which can be communicated to the host processor 2 through an interrupt.

The RTO processor 12 is setup and controlled by the host processor 2 for the real-time rendering of object based graphic image and a full description of a specific example of the RTO processor 12 can be found in U.S. patent application Ser. No. 08/053,373, claiming priority from Australian Patent Application No. PL2147, filed Apr. 29, 1992 by the same applicant, the disclosure of which has been previously incorporated by reference.

The RTO processor 12, apart from interfacing with the processor bus 3, also interfaces with its own dedicated QPF memory 16, which is implemented as 512k bytes of 25 ns local QPF memory (four 128K×8 rams). These rams are always enabled, and RTO processor 12 drives the read and write strobes directly.

Once setup and started, the RTO processor 12 reads lists of objects from system ROM 4, system RAM 5, or the memory cards into its own local memory, prepares the objects, and then renders the objects, outputting an 8 bit data word an RTO processor level output bus 17, for each pixel of the output device, which describes the level and effects desired for the highest visible object active at the pixel. Preferably, the display lists include object outline data which permit the calculation of graphic images in real time. An example of such data is quadratic polynomial fragments which are normally cached in the system RAM 5, but may be read directly from the system ROM 4 or from memory card 15.

After reading the display list in the form of QPF's, the RTO processor 12 scales and translates the QPF objects in each of the X and Y directions. This allows the implementation of squash and stretch effects, as well as the compensation for different pixel aspect ratios found on different output devices.

Next, QPF's which have been translated or scaled entirely off the screen are removed from the object list by culling. QPF's which are too small to be visible, are also culled. QPF's which cross the boundaries of the output device are also clipped. After initial processing, the QPF's are stored in the dedicated QPF memory 16. Once all the QPF's are stored in the dedicated QPF memory 16, they are sorted into line order and then pixel order in terms of the position of each of the first pixel in each QPF. Subsequently, the intersections of all QPF's with scan lines that they cross are calculated. This is performed in real-time without the use of a frame store. QPF's are not flattened into straight lines before intersection calculation, and accordingly curvature is preserved in the curves even at high magnification. After intersection calculation, the visible ordering of objects is determined and hidden surfaces are removed. Regions of colour are then filled by extending the priority levels for each QPF until the next intersection. Transparency and effect calculations are then performed in hardware and at real-time data rates. In this manner, the RTO processor 12 outputs pixel data for display on raster displays or printing on a copier device in a synchronous manner and comprises colour level data transferred via the level output bus 17.

When the RTO processor 12 is a slave to the host processor 2, the host processor 2 is able to read the control registers of the RTO processor 12 in addition to reading the dedicated QPF memory 16. Access to control registers of the RTO processor 12 is performed by memory mapped I/O techniques. The base address for accessing the dedicated QPF memory 16 is programmed into the RTO processor 12 registers at start-up and is also set according to the host processor memory map table. The RTO processor 12 does not support burst access or byte writes to its registers or dedicated QPF memory 16.

When the RTO processor 12 is in control of the processor bus 3, the RTO processor 12 drives the demultiplexed address and data buses directly. As mentioned previously it requests use of the processor bus 3 by notification and subsequent grant from the host processor 2.

The RTO processor 12 has an interrupt output signal which is connected to the host processor 2 and forms the highest priority interrupt (INT0) of that device. This interrupt can be used to indicate many events including completion of operations and internal error events.

The 8-bit contents of the RTO processor output level bus 17 is used to form the address of a dual port RAM 8 which is used as a colour palette between the RTO processor 12 and a colour copier 24 such as a Canon CLC 500. Preferably, the dual port RAM 8 is divided into a number of separate palette areas, with a separate palette area being chosen after a predetermined number of lines have been printed by the copier 24. The copier 24 operates by means of a four pass process. The four colour passes include Cyan, Magenta, Yellow and Black (CMYK). Hence swapping of palette areas can be timed to occur at the completion of each colour pass of the copier 24. One port of the dual port RAM 8 outputs the colour selected by the RTO processor 12 to a copier interface buffer 25.

The copier interface buffer 25 outputs the current pixel colour in addition to pixel clocking information, copier enablement signals and line enable signals obtained from a timing bus 26 output from the RTO processor 12, by way of RS422 output drivers, to the copier 24 according to its specific timing requirements. Where the copier 24 is a CLC 500, the buffers 25 output to an IPU port of that copier. The other port of the dual port RAM 8 is connected to the processor bus 3. This port is readable and writable and permits burst accesses by the host processor 2 which can be used by the host processor 2 to alter the colour palette area by software control. Hence the colour palettes can by changed at any time by the host processor 2 including between the time that the copier 24 is engaged in a colour pass or even when the copier 24 is engaged in a current colour pass.

The RTO processor output level bus 17 is also fed to a video processing unit 27 which contains a video synchronisation unit, preferably implemented by a 74ACT715 Video Synchronization Generator which is a programmable video synchronization generator, capable of producing a wide range of different sync waveforms and timings. The host processor 2, acting under software control, is designed to program the video synchronisation unit at start-up by the processor bus 3, so as to output the correct synchronisation timings and interlace factors as required by the particular video device, such as video TFT LCD display 28. The interlace factor is also forward to the RTO processor 12.

The video processing unit 27 also contains a RamDac device which is preferably implemented by a Bipolar Technologies, BT478 RamDac device, which is software programmable to contain a palette of 256 colours. The RamDac can be software programmed by the host processor 2 at start-up or during operation. In addition to the colour palette, the RamDac has a single overlay pattern available which can be preprogrammed by the host processor 2 so that when the RTO processor 12 is being used to print an image on the copier 24, the video TFT LCD display 28 can be colour blanked. The RamDac of the video processing unit 27 reads in the current value of the RTO processor output level bus 17 and uses this to determine which of 256 output colours to output to the video TFT LCD display 28. Output is in an RGB analog output format in addition to vertical and horizontal synchronization information and backlight brightness control information.

Figure 2:
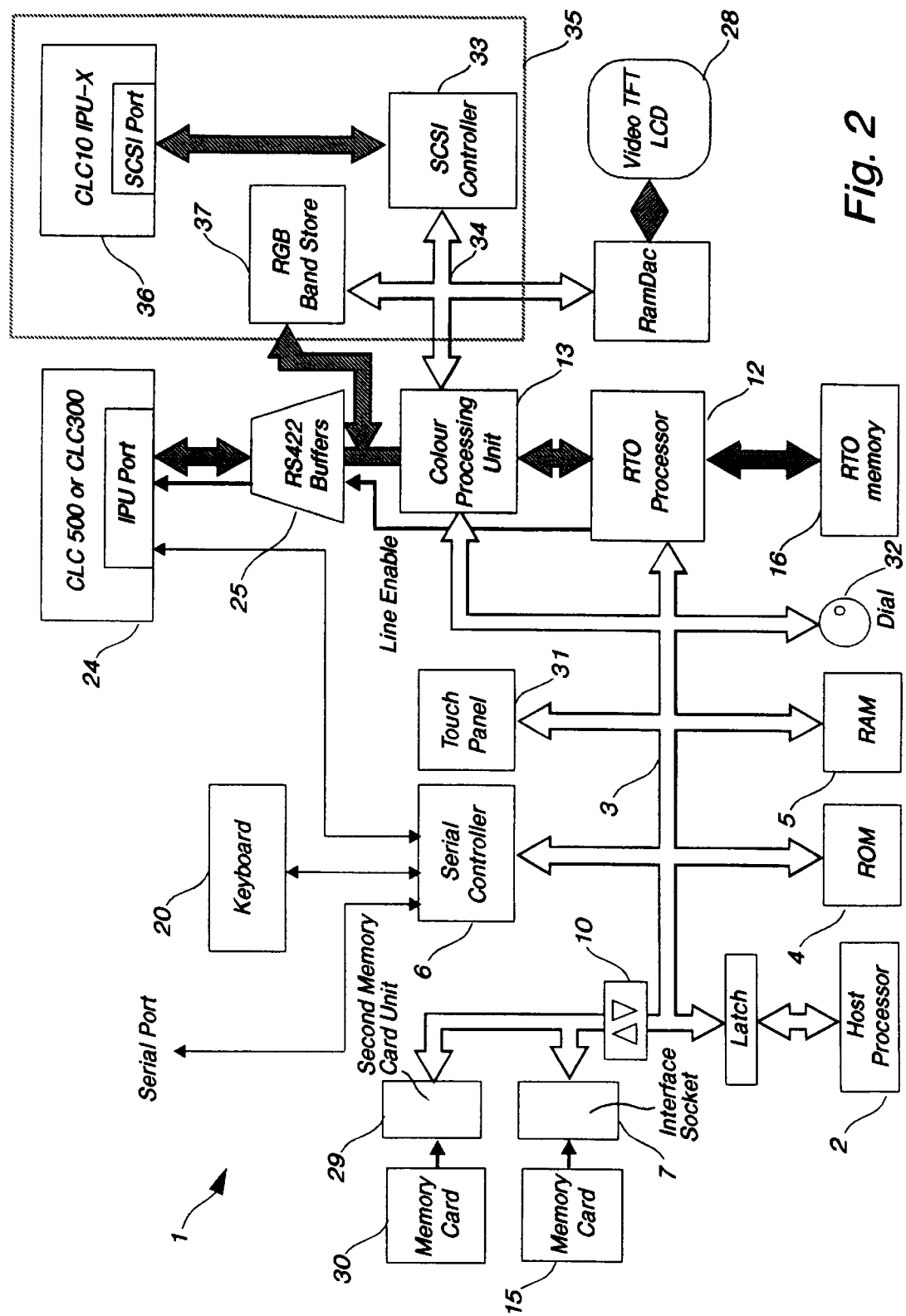
FIG. 2 is a schematic block diagram of a preferred embodiment.
Figure 3:
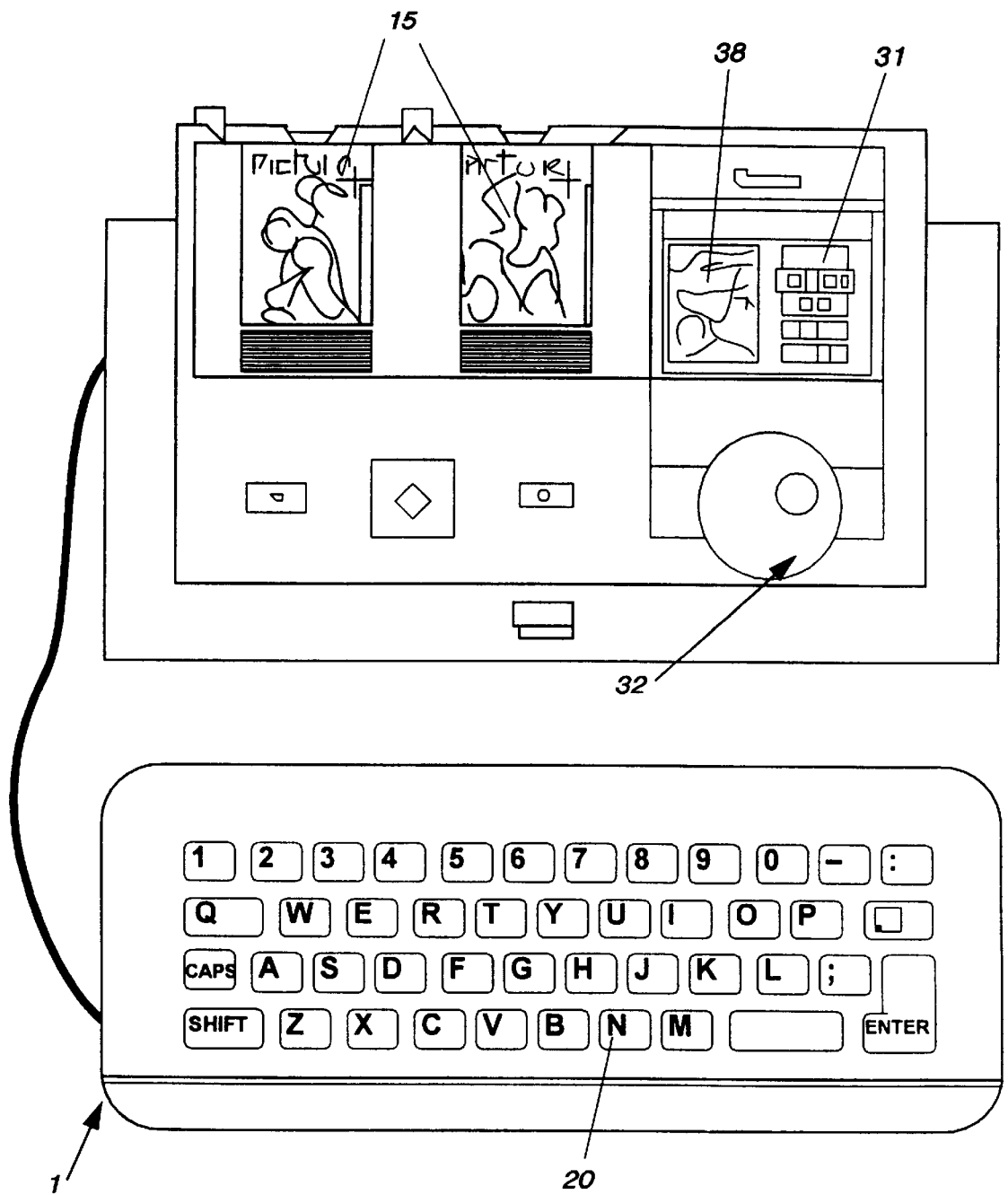
FIG. 3 is an illustration of the preferred embodiment.

Referring now to FIG. 2 and FIG. 3, there is shown the preferred embodiment of the present invention. This embodiment is similar in structure to the first embodiment and corresponding components are numbered identically. Additional features include a second memory card unit 29 adapted to simultaneously receive a second memory card 30, a touch panel 31, a dial control 32, a RGB band store 37 and a SCSI controller 33. Additionally a colour processing unit 13 has replaced the dual port RAM 8 of FIG. 1.

The second memory card unit 29 is used to substantially increase the range of graphics materials such as libraries of graphics objects, object edit lists, clip titles, fonts, animated characters etc. that can be accessed by the host processor 2 thereby substantially increasing the overall utility of the presentation system 1.

The transparent touch panel 31 is provided over either one of the memory card units or over the video TFT LCD display 28, to increase the ease with which a user can select a desired object in the creation of an image or carry out a particular command. The touch panel 31 includes an interface unit (not shown) for deriving an X-Y position of a depression of the touch screen and sending this value to the host processor 2.

A dial control 32 is also provided and allows for the rapid selection of a desired object on the video TFT LCD display 28 amongst a multitude of different objects, thereby also increasing the efficiency of selection of objects formed in the creation of any image.

The colour processing unit 13 is provided in replace of the dual port RAM 8 of FIG. 1. The colour processing unit 13 consists of a colour generation and mixing (CGM) device for each single colour component of the output colour space of said colour processing unit 13. A full description of the operation of the CGM device and its configuration as the colour processing unit 13 is given in U.S. patent application Ser. No. 08/053,231, filed Apr. 28, 1993, filed by the present applicant simultaneously herewith and entitled "A Colour Generation and Mixing Device", the disclosure of which is incorporated herewith by reference.

The colour processing unit 13 can produce RGB colour information 34 from colour information received from RTO processor 12. The RGB colour information 34 can be used for display on the video TFT LCD display 28. The colour processing unit 13 can also be used to determine the CYMK output for the copier 24 by the host processor 2 loading the correct colour control information at the start of each pass of the colour copier and then reloading RGB colour control information for the video TFT LCD display 28 at the end of the printing process.

Additionally, there is provided the optional capability for interfacing with other forms of output devices 35 such as a ink jet copier 36 (the Canon CLC 10 for example) which is capable of printing an image in a number of predetermined bands. This can accomplished by storing RGB colour information in a RGB band store 37 before forwarding it to a SCSI controller 33 which is used for forwarding the RGB colour information to the SCSI interface, of the ink jet copier 36.

The foregoing describes only two embodiments of the present invention particular to specific output devices. Use of other types of output devices and other modifications, obvious to those skilled in the art, can be made thereto without parting from the scope of the invention

What is claimed is:

1. A graphics system for a color printer, said system comprising an input for object-based image data, host processor means connected to a user controllable input means for selecting and editing said object-based image data to create edited image data, real-time image processing means for selecting said edited object-based image data from an intermediate storage means, for determining outline intersections for each graphic object in said image data, for rendering said selected edited object-based image data utilizing said outline intersections without using a pixel-based data storage in a rendering memory, and for directly outputting a pixel-based image signal in real-time, and communication means for interconnecting said system with said printer for printing an image represented by said image signal.

2. A graphics system as claimed in claim 1 wherein said real-time image processing means comprises a real time object processor means for rendering said edited image data, and said system further comprises a color transformation means connected to said real time object processor means and adapted to receive said rendered edited image data and to determine said image signal from said rendered edited image data.

3. A graphics system as claimed in claim 1 wherein said image data is based on quadratic polynomial fragments.

4. A graphics system as claimed in claim 1 wherein said real-time image processing means also produces a video image signal for driving a video presentation means incorporated in said graphics system and adapted to receive said video image signal and display a corresponding video image.

5. A graphics system as claimed in claim 2 wherein said color transformation means includes a color mixing and generation device for each color component of said image signal.

6. A graphics system as claimed in claim 5 wherein said host processor means connects and supplies color information to said color transformation means, said color information being used to modify said rendered edited image data to form said image signal.

7. A graphics system as claimed in claim 6, wherein said color transformation means includes a memory device having a plurality of color storage areas for storing said color information.

8. A graphics system as claimed in claim 7 wherein said memory device further comprises a dual ported memory device with one port connected to said host processor means and said color information in the color storage areas is alterable by said host processor means.

9. A graphics system as claimed in claim 4 wherein said video image signal comprises only a portion of the image which is to be printed by said printer.

10. A graphics system as claimed in claim 1 wherein said input includes a plurality of memory storage housing means adapted to receive detachable memory storage devices containing said object-based image data.

11. A graphics system as claimed in claim 10 wherein said detachable memory storage devices are in the form of non-volatile memory cards.

12. A graphics system as claimed in claim 10 wherein at least one of said memory storage devices includes information used to control operation of said graphics system.

13. A graphics system as claimed in claim 10 wherein said input further comprises detection means for determination of the presence or absence of at least one of said detachable memory storage devices.

14. A graphics system as claimed in claim 1 further comprising a touch panel, sensitive to a users input and adapted to indicate a location of said input to said host processor means.

15. A graphics system as claimed in claim 1 further including dial control means connected to said host processor means and adapted to receive directional inputs from the user of said graphics system.

16. A graphics system according to claim 1, wherein said printer is included in a color copier.

17. A graphics system for a color printer, said system comprising an input for object-based image data, host processor means, connected to said input and a user controllable input means, for selecting said object-based image data and for creating edited object-based image data, real-time image processing means connected to said host processor means and to a memory, said memory having a capacity smaller than that of a frame memory and being configured to store said object-based image data and said edited object-based image data, said real-time image processing means being configured for determining outline intersections for each graphic object in said image data, for manipulating said stored object-based image data utilizing said outline intersections, and for rendering directly therefrom, without intermediate pixel-based data storage in a rendering memory, pixel-based image data as an output image signal in real-time, and communication means for interconnecting said system with said printer for printing an image represented by said output image signal.

18. A graphics system according to claim 17, wherein said printer is included in a color copier.

19. A method for printing a graphic object image using a color printer, said method comprising the steps of:

receiving object-based image data from a data source;

selecting and editing said object-based image data to create edited object-based image data;

determining outline intersections for each graphic object in said image data;

rendering said selected object-based image data by manipulating said edited object-based image data utilizing said outline intersections, without using a pixel-based data storage in a rendering memory to form a pixel-based image signal;

directly outputting said pixel-based image signal in real-time; and providing said pixel-based image signal in real time to said printer for printing said graphic object image.

20. A method according to claim 19, wherein the image is a rasterised image and said rendering comprises the steps of determining said outline intersections for each graphic object in said image data, determining an object viewing priority for each pixel location of a line of said image, and assigning a color to each pixel location according to the corresponding object viewing priority.

21. A method according to claim 20, wherein said image data is based on quadratic polynomial fragments and said rendering comprises calculating said outline intersections for said quadratic polynomial fragments.

22. A method according to claim 19, wherein said selected edited object-based image data is used to produce a video image signal from which a corresponding video image can be displayed.

23. A method according to claim 20, wherein the assigning of a color comprises assigning a color for each color component of said image signal.

24. A method according to claim 23, wherein said selecting and editing also includes supplying color information used for said assigning.

25. A method according to claim 19, wherein said receiving further includes receiving said object-based image data from at least one of detachable portable memory storage devices.

26. A method according to claim 25, wherein said detachable portable memory storage devices are in the form of non-volatile memory cards.

27. A method according to claim 25, wherein at least one of said memory storage devices includes information used to control said editing and selecting.

28. A method according to claim 25, further comprising the step of determining of the presence or absence of at least one of said detachable memory storage devices.

29. A method according to claim 19, wherein said printer is included in a color copier.

30. A method for printing a graphic object image on a color printer, said method comprising the steps of:

receiving object-based image data;

selecting said object-based image data;

creating edited object-based image data;

storing said edited object-based image data in a memory having a capacity smaller than that of a pixel-based frame memory;

determining outline intersections for each graphic object in said image data;

manipulating said stored object-based image data utilizing said outline intersections, to render directly therefrom without intermediate pixel-based data storage in a rendering memory, pixel-based image data as an output image signal in real-time; and supplying said pixel-based image data to said printer for printing an image represented by said output image signal.

31. A method according to claim 30, wherein said printer is included in a color copier.

\* \* \* \* \*

UNITED STATES PATENT AND TRADEMARK OFFICE
CERTIFICATE OF CORRECTION

PATENT NO.   : 6,134,021
DATED        : October 17, 2000
INVENTOR(S)  : Kia Silverbrook, et al.

It is certified that error appears in the above-identified patent and that said Letters Patent is hereby corrected as shown below:

Title page,
Under [75] Inventor, "Kia Silverbrook, Wollahra, Australia" should read -- Kia Silverbrook, Woollahra, Michael J. Webb, Denistone West, David W. Funk, Berowra Heights, Simon R. Walmsely, Epping, all of Australia -- .
Under [73] Assigness, "New South Wales" should read -- North Ryde, --.

Column 3,
Line 64, "PCMIA" should read -- PCMCIA --.

Column 4,
Line 1, "be" should be deleted;
Line 48, "sockets" should read -- socket --; and
Line 49, "connect" should read -- connected --.

Column 5,
Line 23, "an" should read -- to an --.

Column 6,
Line 40, "by" should read -- be --; and
Line 56, "forward" should read -- forwarded --.

Column 8,
Line 13, "real-time," should read -- real time, --;
Line 18, "real-time," should read -- real-time --; and
Line 21, "real-time," should read -- real-time --.

UNITED STATES PATENT AND TRADEMARK OFFICE
CERTIFICATE OF CORRECTION

PATENT NO. : 6,134,021
DATED : October 17, 2000
INVENTOR(S) : Kia Silverbrook, et al.

It is certified that error appears in the above-identified patent and that said Letters Patent is hereby corrected as shown below:

Column 9,
Line 2, "users" should read -- user's --;
Line 27, "real-time," should read -- real time, --; and
Line 45, "real-" should read -- real --.

Column 10,
Line 27, "of the" should read -- the --; and
Line 46, "real-time;" should read -- real time; --.

Signed and Sealed this

Twenty-seventh Day of November, 2001

*Attest:*

*Attesting Officer*

NICHOLAS P. GODICI
*Acting Director of the United States Patent and Trademark Office*